(12) United States Patent
Diaz et al.

(10) Patent No.: US 7,562,532 B2
(45) Date of Patent: Jul. 21, 2009

(54) METHOD FOR OPERATING A GAS TURBINE GROUP

(75) Inventors: Carlos Enrique Diaz, Cincinnati, OH (US); Jürgen Gerhard Hoffmann, Untersiggenthal (CH); Andreas Ullrich, Lauchringen (DE)

(73) Assignee: Alstom Technology Ltd, Baden (CH)

( * ) Notice: Subject to any disclaimer, the term of this patent is extended or adjusted under 35 U.S.C. 154(b) by 0 days.

(21) Appl. No.: 11/655,197

(22) Filed: Jan. 19, 2007

(65) Prior Publication Data
US 2007/0163264 A1 Jul. 19, 2007

Related U.S. Application Data

(63) Continuation of application No. PCT/EP2005/052930, filed on Jun. 23, 2005.

(30) Foreign Application Priority Data
Jul. 19, 2004 (CH) .................. 1215/04

(51) Int. Cl.
F02C 3/30 (2006.01)
F02C 7/143 (2006.01)
F02C 7/057 (2006.01)
(52) U.S. Cl. .............. 60/775; 60/39.3; 60/39.53; 60/728
(58) Field of Classification Search ............ 60/772, 60/775, 39.3, 39.53, 728
See application file for complete search history.

(56) References Cited

U.S. PATENT DOCUMENTS

| 5,083,423 A | 1/1992 | Prochaska et al. |
| 5,463,873 A | 11/1995 | Early et al. |
| 5,930,990 A * | 8/1999 | Zachary et al. ............ 60/775 |
| 6,260,350 B1 * | 7/2001 | Horii et al. ............... 60/39.3 |
| 7,293,415 B2 * | 11/2007 | Hoffmann et al. ........... 60/775 |
| 2002/0106001 A1 * | 8/2002 | Tomlinson et al. ......... 374/144 |
| 2003/0106319 A1 | 6/2003 | Kopko |

FOREIGN PATENT DOCUMENTS

| DE | 25 49 790 | 5/1977 |
| EP | 0 781 909 A2 | 7/1997 |
| EP | 1 203 866 A2 | 5/2002 |
| GB | 2 051 238 A | 1/1981 |
| GB | 2 382 847 A | 6/2003 |
| GB | 2 382 848 A | 6/2003 |
| WO | 03/089770 A1 | 10/2003 |
| WO | WO2004/072453 * | 2/2004 |

* cited by examiner

*Primary Examiner*—Ted Kim
(74) *Attorney, Agent, or Firm*—Buchanan Ingersoll & Rooney PC

(57) ABSTRACT

A gas turbine group comprises a device, arranged in a suction-intake duct, for cooling a suction-intake airflow. The device is, for example, a device for injecting a liquid mass flow. The cooling device is activated automatically when a first limit temperature of the ambient air is overshot and is deactivated automatically when a second limit temperature is undershot. Stability of the automatic algorithm can be improved in that the second limit temperature can lie by a specific amount below the first limit temperature. In one embodiment, the limit temperatures are predetermined as a function of the position of an adjustable initial guide blade cascade.

18 Claims, 2 Drawing Sheets

METHOD FOR OPERATING A GAS TURBINE GROUP

RELATED APPLICATION

This application is based on and claims priority under 35 U.S.C. §119 to Swiss Application No. 01215/04, filed Jul. 19, 2004, and is a continuation application under 35 U.S.C. §120 of International Application No. PCT/EP2005/052930, filed Jun. 23, 2005 designating the U.S., the entire contents of both of which are hereby incorporated by reference.

FIELD

A method for operating a gas turbine group is disclosed.

BACKGROUND

It is known from DE 25 49 790 to introduce a liquid into the suction-intake air of the compressor, upstream of the compressor, in order to increase the power output of a gas turbine group. The injected liquid mass flow is in this case dimensioned from case to case in such a way that, in addition to a first part mass flow, which evaporates upstream of the compressor in the suction-intake air, a further part mass flow penetrates as liquid into the compressor. The liquid cools, on the one hand, due to the evaporation of the suction-intake air, with the result that the mass flow of the working fluid is increased. If, furthermore, liquid penetrates into the compressor, this causes an intensive internal cooling of the air during compression. The power consumption of the compressor and the final compressor temperature fall as a result. This leads to a rise in the net power output and to an improved efficiency of the gas turbine circulation process.

In addition, to increase the power output precisely in the case of high outside temperatures, other methods for cooling the suction-intake air of gas turbine groups are also known, for example evaporation coolers, in which the suction-intake air flows over moistened surfaces, or coolers with heat exchangers which discharge heat from the suction-intake air.

Below a specific temperature of the ambient air and, if appropriate—insofar as the cooling principle is not based on evaporation cooling—above a specific ambient atmospheric moisture, the cooling of the suction-intake air has to be deactivated, so that potentially harmful icing at the compressor inlet is avoided.

According to the prior art, the cooling of the suction-intake air serves primarily for increasing the power output beyond the basic maximum power of the gas turbine group which is available at a specific ambient temperature. If the ambient temperature lies above the critical icing temperature, cooling, for example liquid injection, is enabled and may be activated manually in the event of an increased power demand. As already indicated, the cooling of the suction-intake air and, in particular, the injection of liquid afford further advantages, for example an increase in efficiency and, in the case of a predetermined power output, a reduced temperature level of the overall circulation process. These potentials are utilized only incompletely in the manual activation of the cooling means.

SUMMARY

Exemplary embodiments automatically activate means for cooling the supply airflow of the compressor of a gas turbine group when corresponding conditions, such as with regard to the ambient temperature or the temperature of the inflow upstream of the compressor, if appropriate also with regard to atmospheric moisture, for enabling the cooling of the suction-intake air, for example for the injection of water or water/alcohol mixtures, are fulfilled. The automatic activation of the cooling means can ensure, inter alia, that advantageous effects are utilized insofar as cooling is permissible within the framework of operational reliability, without in this case requiring the attentiveness of the operating personnel. In one embodiment, it is possible generally to deactivate the cooling manually, in order, for example, to save injectable liquid as an operating resource.

In one embodiment, the cooling means, for example a device for introducing a liquid mass flow, are activated only when this first limit temperature, also designated as the activation limit temperature, is continuously overshot at least for a certain delay time of, for example, one minute.

In a further embodiment, the cooling means, for example a device for introducing a liquid mass flow, are deactivated automatically when a second limit temperature, also designated as the deactivation limit temperature, is undershot. This second limit temperature is selected, in particular, to be lower than the first limit temperature. For example, the second limit temperature is selected so as to be 2 or 5° C. lower than the first limit temperature. This difference between the two limit temperatures can avoid an oversensitive activation and deactivation of the means for introducing the liquid mass flow. In a variant of the method, the deactivation of the means for introducing the liquid mass flow takes place only when the second limit temperature has been continuously undershot at least for a second delay time of, for example, five minutes.

The delay times which are fixed for switching on and switching off and the difference between the two limit temperatures, to be precise the limit temperature which triggers a deactivation of the means being lower than the limit temperature which triggers an activation of the means, increase the stability of the automatic algorithm.

It is known, for example from EP 781 909, to activate the introduction of liquid into the inflow of a compressor after the basic full load power of a gas turbine group has been reached. According to an exemplary embodiment described herein, a device for introducing the liquid mass flow into the compressor inflow or other suitable means for cooling the suction-intake air are activated even well below the basic full load power of a gas turbine group, particularly even when an adjustable initial guide blade cascade of the compressor is not completely open. The temperature at which potential icing commences in the compressor inlet also depends, further, on the position of an adjustable initial guide blade cascade of the compressor. If this cascade is to a great extent closed, a sharp acceleration of the flow occurs in the region of the initial guide blade cascade, along with a lowering of temperature. This means that potential icing commences even at a higher ambient temperature than when an initial guide blade cascade is fully open. In one embodiment of the invention, this is taken into account in that the limit temperatures are predetermined as a function of the position of an adjustable initial guide blade cascade of the compressor. Of course, other influencing variables which may influence the commencement of potential icing, such as, for example, the ambient atmospheric moisture, may also be taken into account in fixing the limit temperature. Thus, for example, the limit temperatures may be fixed as a function of the ambient atmospheric moisture. It is also possible, within the framework of the implementation, to calculate a parameter from the ambient temperature and further influencing variables, such as, for example, precisely the position of an adjustable initial guide blade cascade and the ambient atmospheric moisture, and to carry out the activation or deactivation of the cooling means as a function of this parameter. Ultimately, however, this too means the same as activating the means for introducing the liquid mass flow into the supply airflow of the compressor when a limit temperature of the ambient temperature is overshot and, if appropriate, deactivating when a second limit temperature is undershot.

The limit temperature is in this case raised or at least kept constant as a pure function of the position of the initial guide blade cascade during the closing of the initial guide blade cascade and in any event is not lowered as a function of the position of the initial guide blade cascade during the closing of the initial guide blade cascade. The term "limit temperature as a pure function of the position of the initial guide blade cascade" is to be understood as meaning that this requirement is in any event fulfilled when other parameters, on which the limit temperature is potentially likewise dependent, are constant. If further parameters have an influence here, for example the power of the gas turbine group or the moisture of the ambient air, the limit temperature may vary independently of the position of the initial guide blade cascade; however, for any fixed combination of such potential parameters, the required relation between the limit temperature and the position of the initial guide blade cascade is maintained.

In one embodiment, a further fixed lower limit temperature is predetermined, below which the cooling means are always deactivated. Furthermore, a lower limit value of the power of the gas turbine group may also be predetermined, below which the means are always deactivated. In this case, this power limit value may be predetermined as an absolute power or as a relative power of the gas turbine group. A lower limit value of the position of the initial guide blade cascade may likewise be predetermined, the cooling means always being deactivated when the initial guide blade cascade is closed further.

The cooling power of the activated cooling device, for example a liquid mass flow introduced into the inflow of the compressor by a suitable device, is predetermined, in a variant of the disclosed method, as a function of the mass airflow sucked in by the compressor and which depends in turn, in particular, on a position of the initial guide blade cascade. In another embodiment, the cooling power, for example the liquid mass flow introduced into the compressor inflow, is predetermined as a function of the power of the gas turbine group, of its relative power with respect to the full load power, of the final compressor temperature, of the final compressor pressure or of other suitable process variables of the gas turbine process.

The disclosed embodiments which are described herein may, of course, be combined with one another.

BRIEF DESCRIPTION OF THE DRAWINGS

The invention is explained in more detail below by means of exemplary embodiments illustrated in the drawings in which, in particular.

The exemplary embodiments illustrated below are to be understood merely instructively and serve for a better understanding of the invention; of course, not all the aspects of the invention characterized in the claims may be clarified within this framework.

DETAILED DESCRIPTION

Figure 1A:
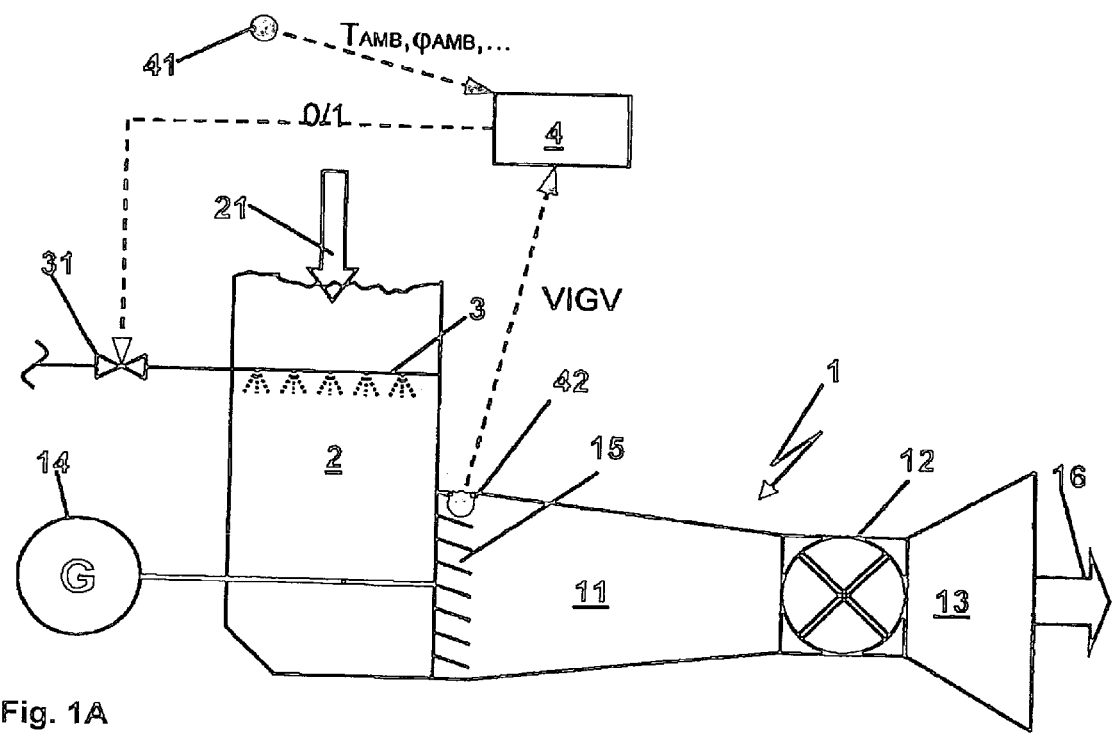
FIG. 1A shows a gas turbine group suitable for carrying out an exemplary method described herein.
Figure 1B:
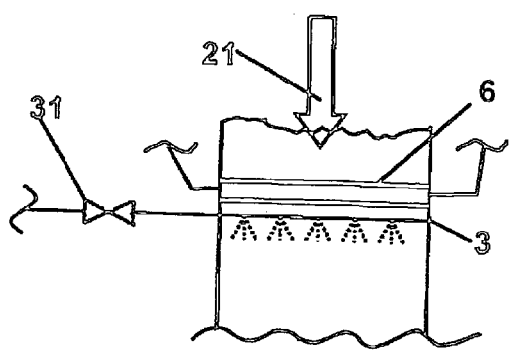
FIG. 1B shows a heat exchanger provided in the airflow duct.

FIG. 1 illustrates an exemplary gas turbine group 1 suitable for carrying out an exemplary method disclosed herein. The gas turbine group 1, known per se from the prior art, has a compressor 11, a combustion chamber 12, a turbine 13 and a generator 14 which is arranged on a common shaft together with the compressor 11 and the turbine 13.

The compressor 11 has, furthermore, an adjustable initial guide blade cascade 15. This can throttle or release the compressor inflow to a different extent, with the result that the mass airflow of the gas turbine group 1 is adapted to the load state in a manner which is known per se and is described sufficiently elsewhere. The supply airflow 21 flows to the compressor through an inflow duct 2; normally, in or on the inflow duct 2, further devices, such as weather protection slats, air filter devices, silencer devices and the like, are arranged, which, however, are familiar per se to a person skilled in the art and are therefore not illustrated, since they are not directly relevant to the implementation of the exemplary embodiment. A smoke gas flow 16 flows out of the turbine 13. Its residual heat may likewise be further utilized in a manner known per se.

Arranged in the inflow duct is a device 3, by means of which a liquid mass flow can be introduced into the supply airflow 21 of the compressor. The evaporation of the liquid in the supply airflow cools the inflow to the compressor and consequently increases the air density and, in the case of a constant position of the initial guide blade cascade 15, the mass airflow. If more liquid is introduced via the device 3 that can evaporate upstream of the compressor in the supply airflow, liquid drops penetrate into the compressor 11. These drops evaporate there with progressive compression and consequently bring about an intensive internal cooling of the compressor 11. A heat exchanger 6 may be used to discharge heat from the supply airflow.

By virtue of this process, the power consumption of the compressor falls, and the useful power available for driving the generator 14 rises. Moreover, if the useful power remains the same, the temperature level in the hot gas part of the gas turbine group is markedly reduced.

During inflow into the compressor, the air is accelerated in the blade cascades of the compressor, with the result that the temperature at the compressor inlet falls. This lowering of temperature becomes all the more pronounced, the greater the extent to which the inflow is throttled by means of the adjustable initial guide blade cascade, that is to say the further the adjustable initial guide blade cascade is closed.

This lowering of temperature may lead to the condensation of moisture from the suction-intake air and ultimately to the formation of ice. The build-up of ice in the inflow region of the compressor, on the one hand, can lead to a deterioration in aerodynamics; on the other hand, ice fragments which come loose, if they penetrate into the compressor, may lead to serious damage to the compressor blades. The build-up of ice in the inflow region of the compressor can therefore as far as possible be avoided.

In the prior art, various possibilities have been disclosed for supplying heat to the compressor inflow and thereby avoiding icing at the compressor inlet. By contrast, the injection of a liquid in the inflow duct 2 increases the risk of icing under unfavorable conditions. On the one hand, the temperature of the air is lowered further as a result of the evaporation of the liquid; on the other hand, further moisture is supplied which may freeze in the compressor inlet. Consequently, under specific ambient conditions, the introduction of liquid upstream of the compressor is deactivated.

The gas turbine group illustrated has at least one sensor 41 for the ambient temperature $T_{AMB}$ and, optionally, for the atmospheric moisture $\phi_{AMB}$ of the ambient air. Alternatively, this measurement point may also be arranged in the inflow duct, upstream of the initial guide blade cascade; the inflow temperature is then measured.

The measurement values are evaluated in the function block 4. The function block 4 determines from the measured values whether a permissible or an impermissible operating state for liquid injection is present and generates correspondingly a binary signal 0/1 which acts on the actuating member 31 and as a result of which the device 3 for introducing a liquid mass flow into the compressor inflow is activated or deactivated. That is to say, if the temperature $T_{AMB}$ undershoots a permissible minimum value, the device is deactivated. On the other hand, the device is activated automatically when a temperature limit value which reliably allows operation is overshot. These temperature limit values could optionally be fixed as a function of the ambient atmospheric moisture and/or other parameters.

Furthermore, at a measurement point 42, the position VIGV of the adjustable initial guide blade cascade 15 is determined, and this is likewise evaluated in the function block 4. In this case, furthermore, the limit temperatures at which activation or deactivation of the device 3 takes place are fixed as a function of the position of the adjustable initial guide blade cascade. In this case, these selected temperatures are higher, the further the adjustable initial guide blade cascade is closed, since an adjustable initial guide blade cascade closed to a great extent is accompanied by a correspondingly greater lowering of temperature in the initial guide blade cascade. The liquid mass flow introduced when a device 3 is activated is in this case fixed, for example, in proportion to the mass airflow sucked in by the compressor.

Figure 2:
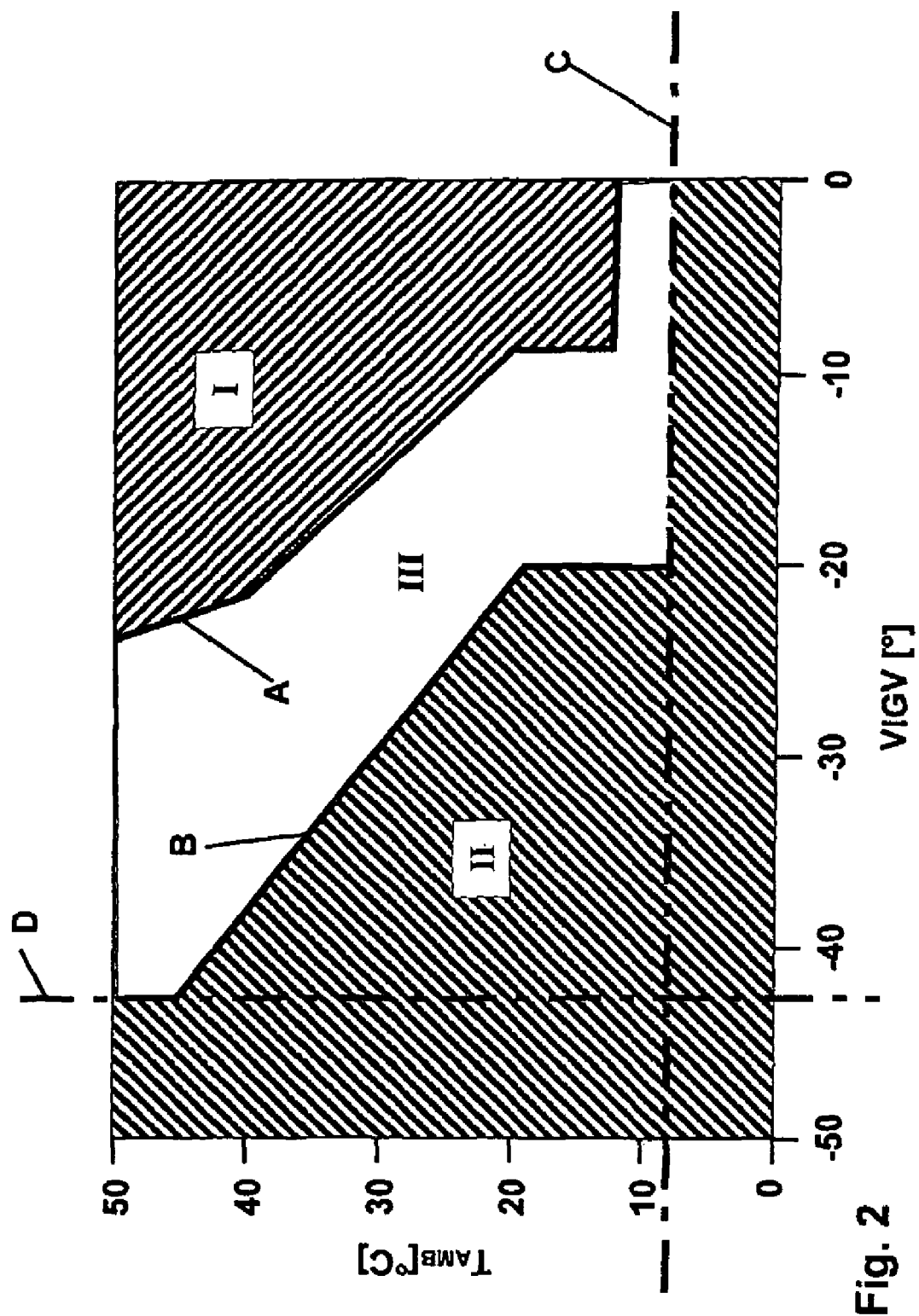
FIG. 2 shows an exemplary illustration of regions in which means for introducing liquid mass flow are activated or deactivated as a function of ambient temperature and position of an adjustable initial guide blade cascade.

FIG. 2 illustrates an example of how the regions in which the device for introducing the liquid mass flow is activated or deactivated can be fixed as a function of the ambient temperature and of the initial guide blade cascade. In this case, the ambient temperature $T_{AMB}$ is plotted on the vertical axis, and the position VIGV of the adjustable initial guide blade cascade is plotted on the horizontal axis.

Thus, a position of the initial guide blade cascade of 0° means that the initial guide blade cascade is open to a maximum. The adjustable initial guide blade cascade is closed increasingly toward negative angular positions. That is to say, the maximum closed position of the adjustable initial guide blade cascade is found on the left in the graph at −50° and the maximum open position of the adjustable initial guide blade cascade is found on the right at 0°.

The area of the graph is subdivided into three regions I, II and III. The line designated by A represents the profile of the activation limit temperature against the position of the initial guide blade cascade. The line designated by B represents the profile of the deactivation limit temperature against the position of the initial guide blade cascade. When the line A leaves the region III and enters the region I, the activation signal for the means for introducing the liquid mass flow is set at active. That is to say, in the region I, the injection device 3 is always activated. If the line identified by B leaves the region III and enters the region II, the activation signal is set at inactive. That is to say, in the region II, the device 3 is always deactivated.

The activation status is not changed if the overshooting of lines A and B in each case takes place in reverse. The deactivation limit temperature in this case always lies below the activation limit temperature.

The region III is formed between these. In this region, the injection device—or other means for cooling the suction-intake air, as appropriate—may be both activated and deactivated. This intermediate region prevents an oversensitive reaction of the automatic activation and deactivation algorithm. The lines designated by C and D designate absolute limit values of the ambient temperature and of the position of the initial guide blade cascade, below which values the device is always deactivated.

The method explained above for the automatic activation and deactivation of means for cooling the inflow of a compressor of a gas turbine group, for example a device for introducing a liquid mass flow into the inflow of a compressor of a gas turbine group, makes it possible to activate these means whenever the operating state of the gas turbine group and the ambient conditions allow this. In this case, the means are activated even below the basic full load of the gas turbine group at which the adjustable initial guide blade cascade is fully open.

The advantages afforded by cooling, in particular the increased efficiency on account of the lower power consumption of the compressor, are therefore utilized whenever possible, without the constant attentiveness of the operating personnel being required for this purpose. Of course, within the scope of the invention, a possibility may also be provided for permanently deactivating the means manually, for example in order to save water. In the case of a low part load of the gas turbine group, cooling is deactivated automatically, for example to save water, without the attentiveness of the operating personnel being required.

The invention is described by way of example in terms of the injection of a liquid mass flow into the inflow of the compressor; the transfer of the automatic activation and deactivation algorithm to general means for cooling the compressor inflow will easily become apparent to a person skilled in the art.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS

1 Gas turbine group
2 Inflow duct
3 Cooling means, device for introducing a liquid mass flow
4 Function block
11 Compressor
12 Combustion chamber
13 Turbine
14 Generator
15 Adjustable initial guide blade cascade
16 Smoke gas flow
21 Supply airflow
31 Actuating member
41 Measurement point
42 Measurement point
A Profile of the activation limit temperature B Profile of the deactivation limit temperature
C Absolute lower temperature limit value
D Absolute limit value of the position of the initial guide blade cascade
$T_{AMB}$ Ambient temperature
$\phi_{AMB}$ Relative atmospheric moisture of the ambient air
VIGV Position of the adjustable initial guide blade cascade

We claim:

1. A method for operating a gas turbine group, comprising:
measuring a temperature of ambient air ($T_{AMB}$) and/or a temperature in an inflow duct of the gas turbine group to provide a temperature measurement value, upstream of a compressor of the gas turbine group, and
automatically activating means, arranged upstream of the compressor of the gas turbine group, for cooling the supply airflow of the compressor when a first limit temperature for this measurement value is overshot, wherein the means for cooling are activated for a partially closed position of an adjustable initial guide blade cascade, wherein the first limit temperature is a function of the position of an adjustable initial guide blade cascade of the compressor, where at least over a range of the position of the initial guide blade cascade, the first limit temperature is higher, the further the initial guide blade is closed.

2. The method as claimed in claim 1, wherein a second limit temperature is a function of the position of an adjustable initial guide blade cascade of the compressor.

3. The method as claimed in claim 2, wherein the second limit temperature is higher, at least over a range of the position of the initial guide blade cascade, the further the initial guide blade cascade is closed.

4. The method as claimed in claim 3, wherein the first and/or second limit temperature is raised or at least kept constant as a function of a position of the initial guide blade cascade during closing of the initial guide blade cascade, and the first and/or second limit temperature is not lowered as a function of the position of the initial guide blade cascade during the closing of the initial guide blade cascade.

5. The method as claimed in claim 1, wherein a fixed lower limit temperature is predetermined, below which the means for cooling are always deactivated.

6. The method as claimed in claim 1, wherein the cooling is performed using an evaporation cooler.

7. The method as claimed in claim 1, wherein a heat exchanger of the cooling means, in the activated state, discharges heat from the supply airflow.

8. The method as claimed in claim 1, wherein a device of the cooling means for introducing a liquid mass flow into the supply airflow, such that with the means activated, a liquid mass flow is introduced into the supply airflow.

9. The method as claimed in claim 1, wherein a first delay time is fixed and, after the overshooting of the first limit temperature, the means for cooling are activated only when the first limit temperature has been overshot at least for the entire delay time.

10. The method as claimed in claim 1, wherein when a second limit temperature is undershot, the means for cooling the supply airflow are deactivated automatically.

11. The method as claimed in claim 10, wherein the second limit temperature is selected to be lower than the first limit temperature.

12. The method as claimed in claim 11, wherein a second delay time is fixed and, after the undershooting of the second limit temperature, the means for cooling are deactivated only when the second limit temperature has been undershot at least for the entire second delay time.

13. The method as claimed in claim 1, wherein the ambient atmospheric moisture is measured and at least one limit temperature is a function of the measured atmospheric moisture.

14. The method as claimed in claim 1, wherein a lower limit value of power of the gas turbine group is predetermined, below which the means for cooling are always deactivated.

15. The method as claimed in claim 14, wherein the power limit value is predetermined as a relative power of the gas turbine group.

16. The method as claimed in claim 1, wherein a limit value of the position of the initial guide blade cascade is predetermined, the means for cooling always being deactivated when the initial guide blade cascade is closed beyond the limit value.

17. The method as claimed in claim 1, wherein a cooling power applied by the means for cooling is a function of the mass airflow sucked in by the compressor.

18. The method as claimed in claim 1, wherein a liquid mass flow introduced into the supply airflow by a device for introducing a liquid mass flow is a function of the mass airflow sucked in by the compressor.

* * * * *